United States Patent [19]

Winkler et al.

[11] 4,317,166
[45] Feb. 23, 1982

[54] CIRCUIT ARRANGEMENT FOR SELF-COMMUTATED INVERTERS

[75] Inventors: Jiri Winkler; Josef Cibulka; Jan Bryksi; Richard Jelinek, all of Prague; Jan Krtek, Karlovy Vary; Vladimir Mickal, Pilsen; Jaroslav Hlousek; Milan Kondr, both of Prague, all of Czechoslovakia

[73] Assignee: CKD Praha, oborovy podnik, Prague, Czechoslovakia

[21] Appl. No.: 109,187

[22] Filed: Jan. 2, 1980

[30] Foreign Application Priority Data

Jan. 2, 1979 [CS] Czechoslovakia ............ 40-79

[51] Int. Cl.$^3$ ................................. H02M 7/515

[52] U.S. Cl. ............................... 363/138; 363/37; 363/71

[58] Field of Search ............... 363/34, 37, 69–72, 363/96, 135–138; 307/252 M, 252 P

[56] References Cited

U.S. PATENT DOCUMENTS

| | | | |
|---|---|---|---|
| 3,612,973 | 10/1971 | Kuniyoshi | 363/137 X |
| 3,707,668 | 12/1972 | Johnston | 363/137 |
| 3,838,330 | 9/1974 | Rosa | 363/137 X |
| 3,924,173 | 12/1975 | Goswami | 363/135 |

Primary Examiner—William M. Shoop
Assistant Examiner—Peter S. Wong

[57] ABSTRACT

Circuit arrangement for inverters with three stage self-commutation suitable for large outputs and for parallel connection of main thyristors and separating reactors.

7 Claims, 3 Drawing Figures

CIRCUIT ARRANGEMENT FOR SELF-COMMUTATED INVERTERS

BACKGROUND OF THE INVENTION

The invention relates to a circuit arrangement for inverters with three stage commutation, particularly suitable for inverters of large output with parallel connection of main thyristors.

Self commutated inverters are known wherein the commutation process proceeds in two stages, so-called inverters with two stage commutation. The commutation capacitors of these inverters must in addition to achieving the proper blocking of the thyristor, also store an accumulation of power from the induction load, i.e. in asynchronous motors, the power of the magnetic stray field. This leads to a large capacity of these capacitors and to substantial difficulties at limit conditions, for instance to a limited frequency range. These problems are solved by application of a three stage commutation, where the functions of the commutation circuit are separated to the proper disconnection of the thyristors and the accumulation of power. It is possible to propose, on the base of a three stage commutation, a number of different inverter circuit arrangements such as, the arrangement according to the Czechoslovak certificate of authors of an invention No. 169.899. The use of three stage commutation however does not solve all problems of inverter circuits, for instance overloading, a reliable commutation with valves connected in parallel, with separating reactors, etc. The inverter with three stage commutation according to the above mentioned certificate No. 169.899 is not suitable for large outputs, particularly not for a connection in parallel of main thyristors and separating reactors. This is due to the circumstance that, in the case of an increase of commutation currents, the inductances in the commutation circuits are lowered and are comparable to the inductances of the separating reactors, possibly including the selfinductance of connecting bars and supply conductors. Together with requirements for overloading where requirements on commutation ability are furthermore increased and inductances in the commutation circuits are therefore decreasing, this circuit arrangement is not suitable.

SUMMARY OF THE INVENTION

It is an object of this invention to eliminate this drawback and to provide a circuit arrangement suitable for large outputs, allowing a parallel connection of main thyristors and separating reactors.

The present invention is an improvement in inverter apparatus energizing an AC load. It comprises a plurality of inverter output terminals connected to said AC load and a source of DC current having a first and second DC output terminal, an inverter circuit comprising a first main thyristor circuit comprising a first and second group of main thyristors, the cathodes of the first group of main thyristors being connected, respectively, to the anodes of the second group of main thyristors, while the anodes of the first group of main thyristors are coupled to the first DC output terminal, first connecting means for connecting said cathodes of said first group of main thyristors, respectively, to a first selected one of said plurality of inverter output terminals, a first commutation circuit comprising a first commutation thyristor having an anode, connected to said first DC output terminal, a cathode and a gate, an extinguishing circuit connected to said cathode of said first commutation thyristor, a second commutation thyristor having an anode, connected to said extinguishing circuit, a cathode and a gate, a first separating diode connected to said cathode of said second commutating thyristor, and a first block of accumulating diodes having a first DC block terminal, comprising the anodes thereof, connected to said cathode of said first separating diode and a plurality of first accumulating diode output terminals, comprising the cathodes thereof, each being connected to a corresponding one of said inverter output terminals; a second commutation circuit coupled to said second main thyristor circuit and comprising a second block of accumulating diodes having a plurality of anodes, each being connected to a corresponding one of said inverter output terminals, and a plurality of cathodes connected in common to a second DC block terminal, a second separating diode connected to said second DC block terminal, an accumulating capacitor connected to said second separating diode, and a third separating diode interconnected between said accumulating capacitor and said first DC block terminal; wherein said thyristors are energized so that said current passes from said first main thyristor circuit to said first commutation circuit, and from said first commutation circuit to both said second main thyristor circuit and said second commutation circuit, and further comprising means for subsequently blocking said current in said second commutation circuit, whereby said current has transferred from said first main thyristor circuit to said second main thyristor circuit.

DESCRIPTION OF DRAWINGS

Exemplary embodiments of circuit arrangements of inverters according to this invention are indicated in the attached drawings, wherein.

DESCRIPTION OF PREFERRED EMBODIMENTS

Figure 1:
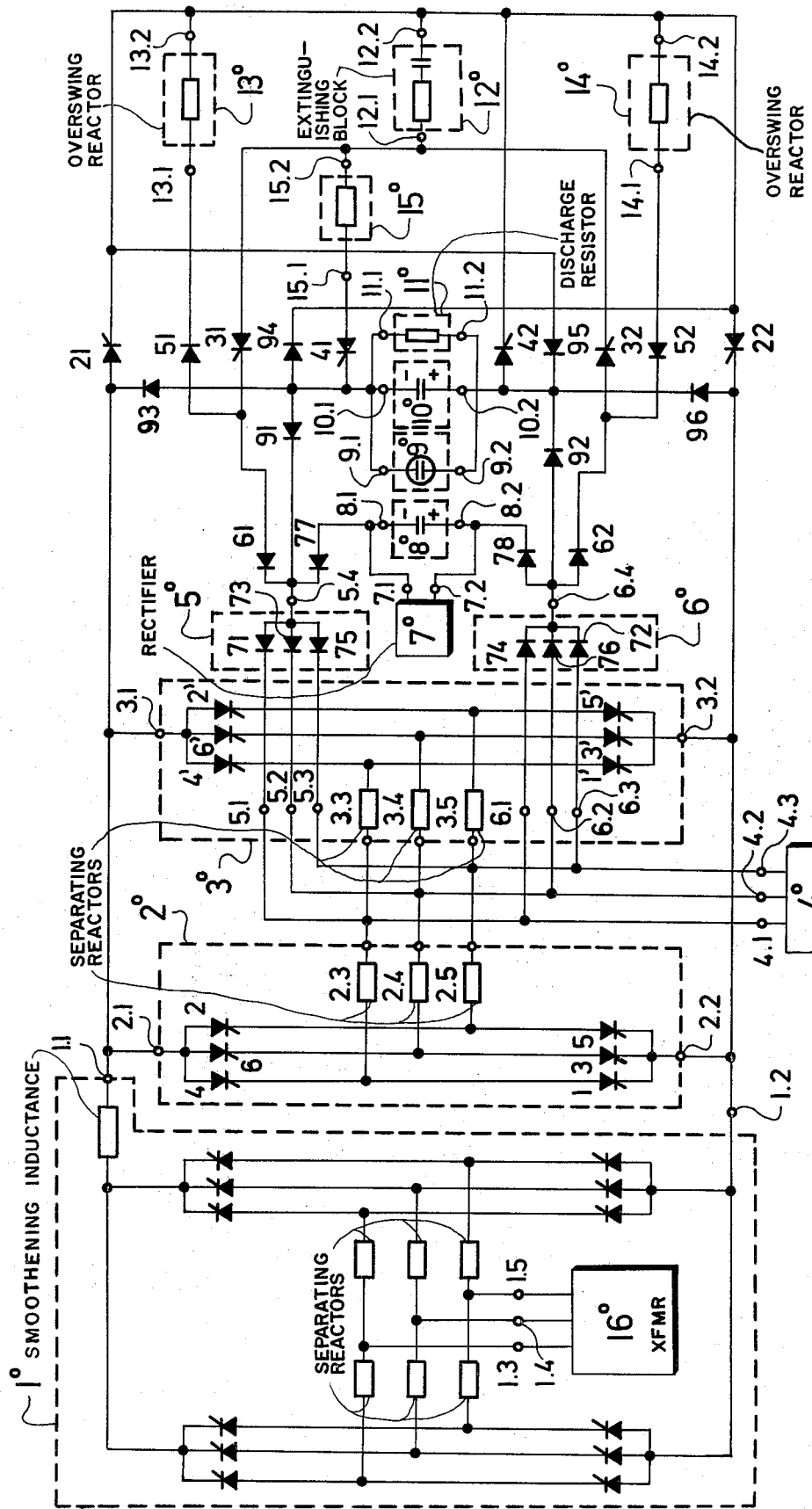
FIG. 1 is an overall circuit arrangement of the inverter with the exception of the current supply.
Figure 2A:
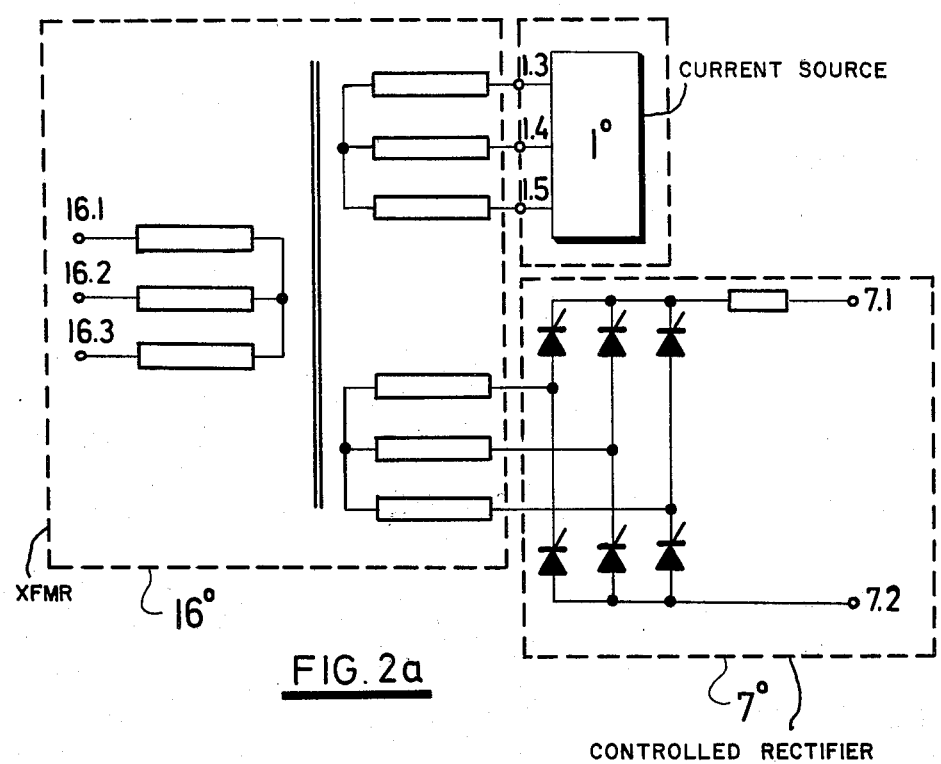
FIG. 2a is an example of the current supply.

FIG. 1 shows an inverter circuit according to this invention. The inverter is energized from a current source 1° formed by two controlled thyristor three phase bridges, connected in parallel over separating reactors on the alternating side and over smoothening inductances on the DC side of these rectifiers. The alternating supply for these bridges (terminals 1.3, 1.4, 1.5 of the current source 1°) is connected to outputs of a first secondary winding of a three phase transformer 16° (see FIG. 2a), the second secondary winding of which may be connected to a controlled rectifier block 7° for removal of the accumulated power.

Figure 2B:
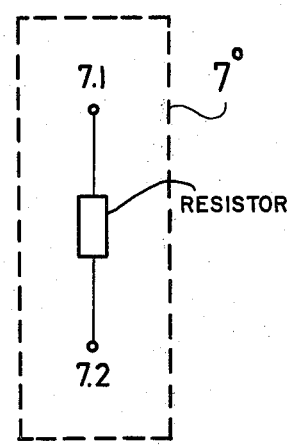
FIG. 2b is an alternative arrangement of a block for removal of accumulated power.

Two main thyristor bridges 2°, 3° comprising thyristors 1, 2, 3, 4, 5, 6 and 1'–6', respectively, and separating reactors 2.3, 2.4, 2.5 and 3.3, 3.4 and 3.5, respectively, are connected in parallel at their terminals 2.1, 2.2, 3.1, 3.2 to the first and second DC output terminals 1.1 and 1.2 of current source 1°. A limiting diode 93 has a cathode connected to terminal 1.1, while the anode of a commutation thyristor 21 is also connected to terminal 1.1. The anode of limiting diode 96 and the cathode of commutation thyristor 22 are connected to terminal 1.2. A charging capacitor 10° is connected between the anode of limiting diode 93 and the cathode of limiting diode 96. A DC charging voltage source 9° is connected in parallel with capacitor 10°. Voltage source 9° can, for instance, comprise a series combination of a circuit breaker, a transformer and a diode bridge rectifier. A discharge resistor 11° is also connected in parallel to charging capacitor 10°. The anode of limiting diode 93 is furthermore connected over a separating diode 91 to a terminal 5.4 on the DC side of a diode block 5° of commutation diodes, comprising diodes 71, 73, 75 and over limiting diode 94 to the anode of commutation thyristor 22. It is furthermore connected over a charging thyristor 41 and a charging reactor 15°, with terminals 15.1, 15.2, to the anode of commutation thyristor 31 and to the cathode of commutation thyristor 32, which are connected over a blocking circuit 12°, having terminals 12.1, 12.2, to the cathode of commutation thyristor 21 and to the anode of commutation thyristor 22. The cathode of the limiting diode 96 is connected both over a separating diode 92 to a terminal 6.4 of the DC side, i.e. the cathodes of accumulation diodes 72, 74, 76 and over the third limiting diode 95 to the cathode of commutation thyristor 21 and also over the charging thyristor 42 to the anode of the commutation thyristor 22. This anode is connected over a series combination of an overswing reactor 14° having terminals 14.1, 14.2 and an overswing diode 52 to the anode of commutation thyristor 32 and to the cathode of separating diode 62. It is also connected over the series combination of an overswing reactor 13° having terminals 13.1, 13.2 and an overswing diode 51, to the cathode of commutation thyristor 31 and to the anode of a first separating diode 61. The cathode of separating diode 61 is connected both with the cathode of a further separating diode 91 and over a series combination of an accumulation capacitor 8° and a third and possibly fourth separating diode 77, 78 to the anode of a sixth separating diode 92, and the anode of the second separating diode 62. A block 7° for removal of accumulated power is connected to the accumulation capacitor 8°, said block comprising, for instance, a resistor (shown in FIG. 2b with terminals 7.1, 7.2) or a controlled rectifier (shown in FIG. 2a with terminals 7.1, 7.2). The terminals 5.1, 5.2, 5.3 and 6.1, 6.2, 6.3, on the alternating side of blocks 5°, 6° of accumulation diodes, are connected to output terminals 4.1, 4.2, 4.3 of the inverter. The latter terminals are connected to the load 4° of the inverter (e.g. an asynchronous motor) and to separating reactors 2.3, 2.4, 2.5 and 3.3, 3.4, 3.5 of the main thyristor bridges 2°, 3°.

Let us suppose that the main current from the source 1° to the load 4° flows from the first output DC terminal 1.1 of the current source 1° to DC terminals 2.1 and 3.1 of the main thyristor bridges 2°, 3° and over parallel thyristors 2, 2' and separating reactors 2.5 and 3.5 to the output terminal 4.3 of the inverter. From the load 4° the current flows back to the source 1° over output terminal 4.2 of the inverter, separating reactors 2.4, 3.4, thyristors 3, 3' and DC terminals 2.2, 3.2 to the terminal 1.2 of the current source 1°. At the moment of commutation the current in the thyristors 2, 2' has to be blocked and the thyristors 4, 4' have to be switched to the conductive state. The polarity of the commutation capacitor in the extinguishing block 12° prior to commutation is positive on terminal 12.1 of this block. By switching the thyristors 31 and 21 to the conductive state, the load current from the thyristors 2, 2' commutates to the commutation thyristor 21, terminal 12.2, terminal 12.1, commutation thyristor 31, and separating diode 61, terminal 5.4, diode 75 and terminal 4.3 of the inverter. The rate of change of commutation currents is determined by the separating reactors in blocks 2° and 3° and by the commutation reactor in the extinguishing block 12°. Simultaneously, with this operation the overswinging of the capacitor in block 12° over the thyristor 31, overswing diode 51 and overswing reactor 13° is proceeding.

After extinguishing of the current in the main thyristors 2, 2', the load current proceeds further in the described circuit over the commutation capacitor in block 12 to the load 7° and charges this capacitor to the opposite polarity, i.e. to the positive polarity on terminal 12.2. After extinguishing of the current in thyristors 2, 2', at which time a voltage prevails on the terminal 12.1 which is almost equal to that of the start of commutation, the following operations are proceeding:

The circuit determined by the following blocks and elements is completed: terminal 4.1, diode 74, diode 92, capacitor of block 10°, diode 93, thyristor 21, block 12°, thyristor 31, diode 61, diode 75, terminal 4.3. A current is generated in this circuit since at the moment of extinguishing of thyristors 2, 2' the voltage between terminals 4.1, 4.3 has such a polarity, that a positive polarity is on terminal 4.1. The voltage sources in block 12° (commutation capacitor) and the countervoltage of the load between terminals 4.1 and 4.3 are connected in series. These series-connected sources are generating over diodes 74, 92 and 93 such a current into the charging capacitor 10°, that the voltage difference remains across the internal impedance of the load on terminals 4.1 and 4.3. This pulsant current drops quickly, as the capacitor in the extinguishing block 12° reduces its voltage to zero and finally changes its polarity. This process is rather important as it generates a negative voltage across just extinguishing thyristors 2, 2'. The voltage on these thyristors due to the described process can not be larger than the voltage on the charging capacitor 10°. The equilibrium between the power which reaches the capacitor 10° due to this process and the power removed by discharge is adjusted by the discharge resistor 11° connected across capacitor 10°.

The commutation process proceeds by overcharging of the commutation capacitor of the extinguishing block 12°. At the moment of passage of the voltage through zero, the polarity of the voltage across the extinguished thyristors 2, 2' changes. Thus, the blocking time of these thyristors is determined. The voltage on the commutation capacitor changes its polarity on terminal 12.2 to a positive one and increases due to passage of DC current from source 1°. When the voltage attains such a value, that it surpasses the value of the combined voltage between the terminals 4.1 and 4.3, another thyristor 4, 4' is closed and the current will commutate from the circuit of the commutation capacitor to the newly closed main thyristors 4, 4'. The moment of this commutation can be controlled by a delayed closing of thyristors 4, 4'. This is important in case it is necessary to change the voltage on the commutation capacitor in dependence on current. The time at which the main thyristors (in this case thyristors 4, 4') are switched to the conductive state for instance are controlled by a voltage sensor on the commutation capacitor of the extinguishing block 12°. After the main thyristors 4, 4' have become conductive, current commutation starts between the phases on terminals 4.1 and 4.3. At this time, capacitor 8° is connected in series to terminal 43 through diode 74, 78, 77, and 75, and with such a polarity that it opposes the flow of current in the "old" phase. The current at terminal 4.3 therefore ceases. On the other hand, current in the phase connected to terminal 4.1 is increased. Charging of the commutation capacitor in the extinguishing block 12° takes place independently of this process.

Just a single polarity is charged if it is positive on terminal 12.2. By the closing of thyristors 42 and 41, the commutation capacitor is charged over the charging reactor 16° from a source—from the charging capacitor 10°. After charging, the thyristors 41 and 42 block. This charging at a single polarity secures particularly the start of the inverter. A further charging can be already accomplished by the above-mentioned delaying of the main thyristors in block 2° and 3°.

The described commutation proceeds in three stages, it is therefore a three stage commutation. For a survey the individual stages of commutation between the load terminals and the output terminals 4.3 and 4.1 of the inverter will be repeated.

I. stage: commutation from the main thyristor to auxiliary circuits. This is from the circuit 2.1 and 3.1, 2, 2′, 2.5 and 3.5, 4.3 to circuit 2.1 and 3.1, 21, 12, 31, 61, 75, 4.3.

II. stage: commutation from circuit 2.1 and 3.1, 21, 12, 31, 61, 75, 4.3 to the circuit of newly closed main thyristors 2.1 and 3.1, 4 and 4′, 2.3 and 3.3, 74, 78, 8°, 77, 75, 4.3.

III. stage: commutation between phases from circuit 2.1 and 3.1, 4, 4′, 2.3 and 3.3, 74, 78, 8, 77, 75, 4.3 to the circuit of the new phase 2.1 and 3.1, 4, 4′, 2.3 and 3.3, 4.1.

In addition to these three commutation stages the following process proceed in parallel. Voltage limitation on the thyristor by means of diodes 92, 93 and the charging capacitor 10°, charging of the polarity of terminal 12.2 on the commutation capacitor of the extinguishing block 12°, overswinging of the commutation capacitor over the diode 51 and the overswing reactor 13°. The commutation overvoltage is limited on the thyristors 2, 2′ by diodes 72, 92 and 93 and by the charging capacitor 10°.

While the invention has been illustrated in a particular type of circuit arrangement, it is not to be limited to the embodiments shown, since various circuit modifications will be obvious to one skilled in the art and are intended to be included in the following claims.

We claim:

1. An inverter apparatus for energizing an AC load, said inverter apparatus comprising a plurality of inverter output terminals connected to said AC load and a source of DC current having a first and second DC output terminal, an inverter circuit comprising a first main thyristor circuit comprising a first and second group of main thyristors, the cathodes of said first group of main thyristors being coupled, respectively, to the anodes of said second group of main thyristors, while the anodes of said first group of main thyristors are coupled to said first DC terminal, first connecting means for connecting said cathodes of said first group of main thyristors, respectively, to a first selected one of said plurality of inverter output terminals, and a second main thyristor circuit, the improvement comprising:

a first commutation circuit comprising a first commutation thyristor having an anode, connected to said first DC output terminal, a cathode and a gate, an extinguishing circuit connected to said cathode of said first commutation thyristor, a second commutation thyristor having an anode, connected to said extinguishing circuit, a cathode and a gate, a first separating diode connected to said cathode of said second commutating thyristor, and a first block of accumulating diodes having a first DC block terminal, comprising the anodes thereof, connected to said cathode of said first separating diode and a plurality of first accumulating diode output terminals, comprising the cathodes thereof, each being connected to a corresponding one of said inverter output terminals, a second commutation circuit coupled to said second main thyristor circuit and comprising a second block of accumulating diodes having a plurality of anodes, each being connected to a corresponding one of said inverter output terminals, and a plurality of cathodes connected in common to a second DC block terminal, a second separating diode connected to said second DC block terminal, an accumulating capacitor connected to said second separating diode, and a third separating diode interconnected between said accumulating capacitor and said first DC block terminal;

wherein said thyristors are energized so that said current passes from said first main thyristor circuit to said first commutation circuit, and from said first commutation circuit to both said second main thyristor circuit and said second commutation circuit; and further comprising means for subsequently blocking said current in said second commutation circuit, whereby said current has transferred from said first main thyristor circuit to said second main thyristor circuit.

2. Apparatus as set forth in claim 1, further comprising means for limiting the voltage across said main thyristor circuits.

3. Apparatus as set forth in claim 2, wherein said voltage limiting means comprises a plurality of diodes, and a charging capacitor connected to said diodes.

4. Apparatus as set forth in claim 1, wherein said blocking means comprises a capacitor.

5. Apparatus as set forth in claim 1, further comprising a block coupled between said DC block terminals for removing accumulated power.

6. Apparatus as set forth in claim 5, wherein said block for removing accumulated power comprises a controlled rectifier.

7. Apparatus as set forth in claim 5, wherein said block for removing accumulated power comprises a resistor.

* * * * *